(12) United States Patent
Meng et al.

(10) Patent No.: US 6,614,834 B1
(45) Date of Patent: Sep. 2, 2003

(54) COMMUNICATION ARRANGEMENT AND METHOD WITH FAST TRACKING RECEIVER FOR SPREAD SPECTRUM SIGNALS

(75) Inventors: Teresa Meng, Portola Valley, CA (US); Won Namgoong, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/376,195

(22) Filed: Aug. 18, 1999

Related U.S. Application Data
(60) Provisional application No. 60/099,445, filed on Sep. 8, 1998.

(51) Int. Cl.[7] .............................. H04B 1/69; H04B 1/707
(52) U.S. Cl. ....................... 375/149; 375/147; 375/150; 375/130; 375/139
(58) Field of Search ................................. 375/149, 147, 375/150, 130, 139

(56) References Cited

U.S. PATENT DOCUMENTS

| | | | | |
|---|---|---|---|---|
| 5,144,256 A | * | 9/1992 | Lim | 329/302 |
| 5,832,021 A | * | 11/1998 | Kondo | 375/200 |
| 5,867,525 A | * | 2/1999 | Giallorenzi et al. | 375/206 |
| 6,393,046 B1 | * | 5/2002 | Kohli et al. | 375/134 |

OTHER PUBLICATIONS

Hodges, M.R.L., *The GSM Radio Interface*, 1990, pp. 31–42.
Stremler, Ferrel G., *Introduction to Communication Systems*, 1992, pp. 627–633.

* cited by examiner

Primary Examiner—Stephen Chin
Assistant Examiner—Sam Ahn

(57) ABSTRACT

A fast-tracking discrimination approach provides rapid acquisition useful for direct-sequence spread spectrum applications. In one example embodiment, the present invention is directed to a communication system receiver that operates a linearly normalizing discrimination process on a signal modulated by a waveform having a bit rate defined in terms of a bit-pulse duration (chip). For at least one reference code, correlation results are obtained from several timing offsets of the signal, where each timing offset is separated by a fixed chip offset. Using at least three consecutive ones of these correlation results, assuming that the correlation energy of band-limited signals is approximately quadratic, an accurate phase error is obtained for synchronizing the received signal. When this embodiment is used in an optimal variable gain filter, the receiver outperforms the normalized classical early-late discriminators despite the unrealistic assumption that such classical discriminators have an exact priori knowledge of the received signal power.

50 Claims, 2 Drawing Sheets

COMMUNICATION ARRANGEMENT AND METHOD WITH FAST TRACKING RECEIVER FOR SPREAD SPECTRUM SIGNALS

BACKGROUND STATEMENTS

This application is a conversion of a provisional application identified by U.S. Ser. No. 60/099,445, filed Sep. 8, 1998 and entitled "Fast Tracking Synchronizer" (fully incorporated by reference) and inventive aspects disclosed herein were made with Government support under contract N65236-96-8608. The Government has certain rights in these inventive aspects.

FIELD OF THE INVENTION

The present invention relates generally to signal communication involving spread spectrum signals. The present invention is particularly useful for and applicable to signal-discriminating receiver arrangements involving direct-sequence spread spectrum signals.

BACKGROUND OF THE INVENTION

Spread spectrum systems involve the communication of twice modulated signals. The first modulation is applied to a carrier signal that is used to carry information, and the second modulation is used to gain certain advantages in transmission. These advantages include, among others, coding the transmitted signal for information privacy, and minimizing the likelihood of the signals interfering with or jamming the transmitted spread spectrum signal. The second modulation purposefully "spreads" the signal in the frequency spectrum. One type of spread spectrum signal, referred to as a direct-sequence spread spectrum ("DSSS") signal, can be created by spreading the spectrum of a modulated carrier signal by directly modulating the modulated carrier signal using a wideband spreading waveform. For a system to be classified as a spread spectrum system, typically the signal energy transmitted by the system occupies a bandwidth larger than and independent of the information bit rate. In most applications, the bandwidth is much larger than the information bit rate.

The transmitted signal is demodulated in a spread spectrum receiver using a correlation process in which the received signal is correlated with a replica of the signal used in the transmitter to spread the signal through the bandwidth. For spreading DSSS signals, a pseudorandom noise (PN) binary sequence is typically used. Despreading DSSS signals involves proper synchronization of the spreading waveform, and the receiver accomplishes this using a replica of this same PN binary sequence. In some implementations, the output of a PN generator in the receiver is multiplied with the incoming bit stream. The resulting signal is filtered using a bandpass filter centered at the carrier frequency, and then processed using a detector that determines if there is a match. If a match is not present, the process is repeated with altered timing in the PN sequence. Once a match is discovered, the receiver switches from this coarse signal acquisition mode to a tracking mode in which the receiver attempts to maintain phase lock for proper alignment between the received PN sequence and the generated replica PN sequence. The duration of the bit pulse in the waveform used to spread the signal in the second modulation is referred to as the "chip interval" (or sometimes "chip"), and its inverse is referred to as the "chip rate."

The receiver's course signal acquisition mode and subsequent tracking mode are, of course, a critical part of any DSSS receiver. Assuming that coarse acquisition has been carried out to within an accuracy to one half chip using one of many conventional techniques, useful information is available only after accurate recovery using the tracking mode. For this reason, achieving rapid tracking acquisition is highly desirable. For the sake of brevity, unless otherwise specified the term "acquisition" hereinafter refers to fine acquisition in the tracking mode.

In packet-type spread communication systems, for example, rapid acquisition reduces the required length of a preamble, which in turn increases net data throughput. Acquisition time can also be traded for receiver power consumption in ranging applications such as communication systems that include position-estimation data as a part of the communication process. Such systems include, among others, cellular phones adapted to comply with the Federal Communication Commission's enhanced "911" mandate, personal locator systems for the elderly, personal navigation systems, the Global Position System, the Russian Global Navigation System, and CDMA systems generally. To accommodate wide use and application of such systems, the receivers employed for analyzing the communicated position-estimation data should be sufficiently small and power efficient to satisfy conventional portability demands.

For many of these applications and according to aspects of the present invention, it would be advantageous to reduce power consumption by occasionally disabling the receiver's signal processing circuitry. Once the signal processing circuitry is disabled, however, reactivating the signal processing circuitry requires reacquisition, coarse and fine, of the received signal. Thus, achieving rapid tracking acquisition is highly desirable because it permits the signal processing circuitry to be more frequently disabled and, due to a shorter time needed to retrack, disabled for longer periods of time.

Tracking, or merely "acquisition" in this context, is generally achieved using a delay-locked loop ("DLL") with a fixed loop gain. The time required for acquisition is approximately proportional to the loop gain, and the DLL's steady state variance is inversely proportional to the loop gain. Thus, any fixed choice of a loop gain represents a trade-off. To achieve both requirements, time-varying loop gains in the context of digital phase-locked loops (DPLL) have been proposed. For various reasons, however, these proposals have not been fully embraced for many applications requiring fast-tracking.

SUMMARY OF THE INVENTION

Various implementations of the present invention are directed to the receiver end of a communication system involving a fast-tracking discrimination approach useful for rapid synchronized acquisition of direct-sequence spread spectrum signals. Some of these implementations are specifically directed to communication systems involving code-division multiple access (CDMA) and to the types of communication systems discussed above.

In connection with the present invention, it has been discovered that by selecting a set of consecutive correlation results from several timing offsets of a direct-sequence spread spectrum signal, an absolute timing error can be obtained from the assumption that there is a polynomial relationship among the consecutive correlation results. One implementation of the present invention is directed to a receiver having a DLL employing discrimination that is approximately linear and independent of the received signal power.

With reference to certain example method and apparatus embodiments, the present invention involves a receiver arrangement having a reference clock for receiving a signal over a delay path, the signal being modulated by a waveform having a bit rate defined in terms of a bit-pulse duration (chip). The signal is rapidly acquired by: for at least one reference code, obtaining correlation results from at least several timing offsets of the signal, wherein each timing offset is separated by a portion of a chip (e.g., about one third); selecting at least three consecutive correlation results; and providing the selected consecutive correlation results as inputs to a polynomial relationship having a degree of at least two, and determining therefrom a timing error useful in receiving the signal.

In another particular embodiment, the above-characterized approach uses a quadratic relationship. In a more specific example embodiment, for at least one reference code, correlation results are obtained from several timing offsets of the signal, where each timing offset is separated by about one third of a chip. Using five consecutive ones of these correlation results, assuming that the correlation energy of band-limited signals is approximately quadratic, an accurate phase error is obtained for synchronizing the received signal. When this embodiment is used in an optimal variable gain filter, the receiver outperforms the normalized classical early-late discriminators despite the unrealistic assumption that such classical discriminators have an exact priori knowledge of the received signal power.

Other aspects of the present invention are directed to particular methods, arrangements and systems involving the above-characterizations. For instance, example applications include systems adapted to synchronize data relatively quickly and/or adapted to process position-estimation data (e.g., based on time of flight or multiple-point angle measurements).

The above summary is not intended to characterize every aspect, or each embodiment, contemplated in connection with the present invention. Other aspects and embodiments will become apparent from the discussion in connection with the FIGS.

BRIEF DESCRIPTION OF THE DRAWINGS

Various aspects and advantages of the present invention will become apparent upon reading the following detailed description of various embodiments and upon reference to the drawings in which.

DETAILED DESCRIPTION

The present invention is believed to be applicable to a variety of systems and arrangements that process data using digital processing circuitry for synchronization. For systems in which the incoming data signal is a spread spectrum signal, the present invention has been found to be particularly advantageous. An appreciation of the invention may be ascertained through a discussion in the context of such system applications.

A first example embodiment of present invention is directed to a receiver arrangement having a reference clock for receiving a signal over a path that introduces a phase error to the signal. The receiver is adapted to receive a signal that has been modulated by a waveform having a bit rate defined in terms of a bit-pulse duration (chip). The receiver receives this signal using a method of synchronizing to the signal, and the method includes obtaining correlation results from at least several timing offsets of the signal for at least one reference code. Each timing offset is separated by a portion of a chip. In one example application each timing offset is separated by a third of a chip, and in another example application each timing offset is separated by a quarter of a chip. Next, between three and five consecutive correlation results are provided as inputs to a polynomial relationship having a degree of at least two, and this polynomial relationship is used to determine a timing error for receiving the signal.

Figure 1:
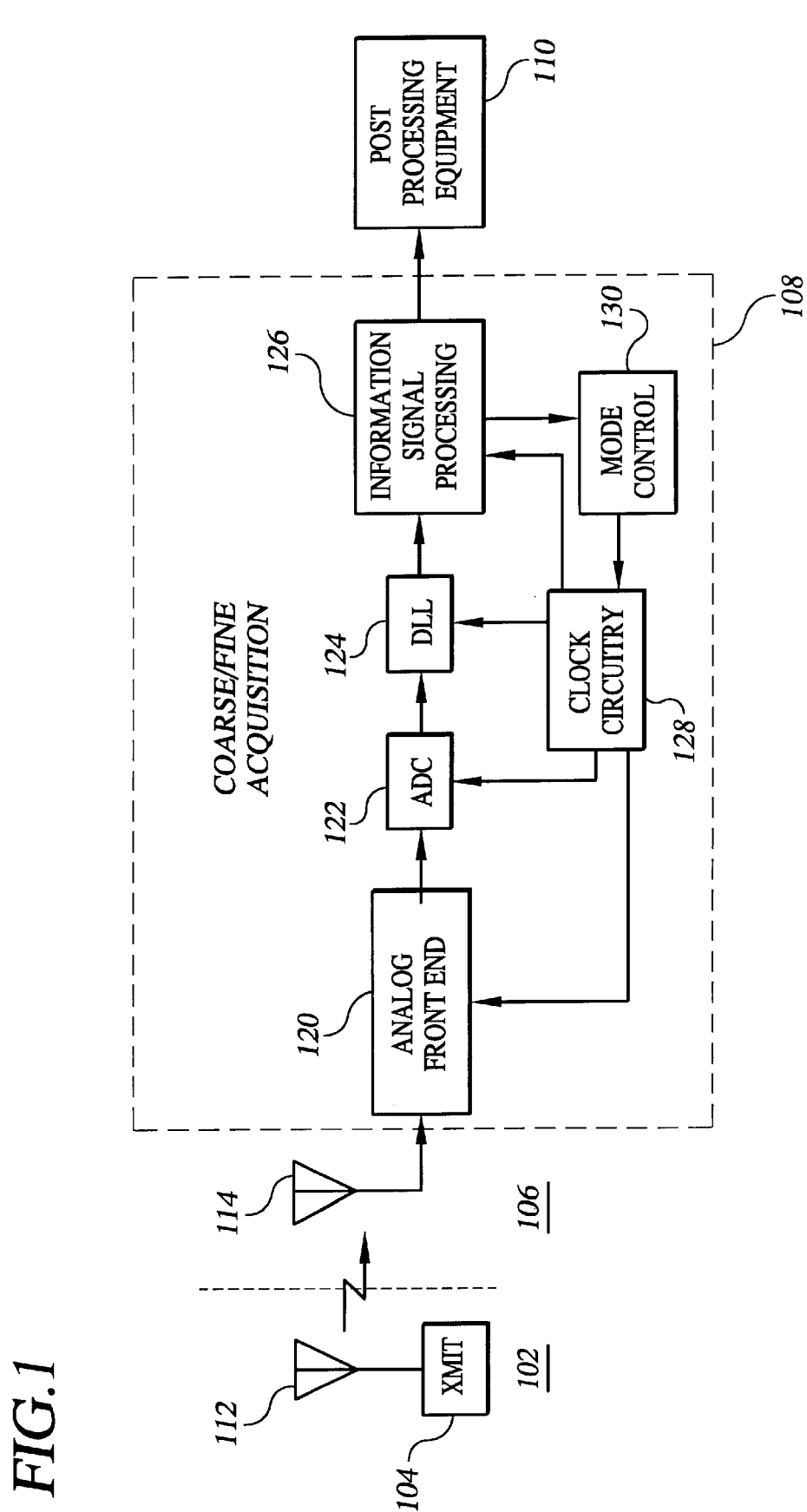
FIG. 1 is a block diagram of a communication system including a transmitter arrangement adapted to transmit a spread spectrum signal and including a receiver arrangement adapted to receive a spread spectrum signal, according to example application of the present invention.

According to a system embodiment of the present invention, FIG. 1 illustrates an example implementation of a communication system of a first communication station 102 having a transmitter arrangement 104 and a second communication station 106 having a receiver arrangement 108. For the sake of brevity, the communication system of FIG. 1 illustrates communication of a spread spectrum signal in one direction; however, it will be understood that this communication system represents any of the following: a simplex system having a transmitter arrangement at one end and a receiver arrangement at the other end; and systems having similarly-constructed transmitter and receiver arrangements at both ends, such as half-duplex and full-duplex systems. The first example embodiment, as discussed above, can be used to implement the illustrated receiver arrangement 108 of FIG. 1.

FIG. 1 also illustrates post-processing equipment 110 as part of the second communication station 106. The post-processing equipment 110 is optional and can be considered as an integral part of the receiver arrangement 108 (e.g., as part of a processor circuit within a portion of the receiver arrangement 108) or as a separate apparatus such as a stand-alone CPU. In typical applications, the receiver arrangement 108 and/or the post-processing equipment 110 includes a display (not illustrated), such as a printer or monitor or storage medium. In other applications, the post-processing equipment 110 includes an output port for controlling another device that does not necessarily require displaying the received and processed spread spectrum signal. Such applications include, for example, calibrating devices and automated control in response to the received and processed spread spectrum signal.

In an example process, the transmitter arrangement generates and sends a spread spectrum signal via an antenna 112. This spread spectrum signal is coupled to an antenna 114 and fed to the receiver arrangement 108 which includes a conventional front end 120 and an analog-to-digital converter (ADC) 122 conventionally adapted to convert the spread spectrum signal to a digital baseband signal. A delay-locked loop (DLL) 124 then synchronizes to the baseband signal using one of various inventive embodiments discussed herein. Intelligible information acquired by the DLL 124 is then further processed, analyzed and/or decoded by an information signal processor circuit 126 for a particular application, for example, communications of images, voice and/or data. A clock circuit 128 includes conventional circuitry for producing a mixing signal to the analog front end 120 and for producing the digital clock signals to each of the ADC 122, the DLL 124, and the information signal processor circuit 126.

As illustrated as an option in this example, the information signal processor circuit 126 is adapted to control a mode-control circuit 130 that significantly reduces the clock rate of the digital clock signals for each of the ADC 122, the DLL 124, and the information signal processor circuit 126. The mode-control circuit 130 (implemented, for example, as part of a DSP circuit 124/126, or using a one shot or timer, a flip-flop, or latch circuit) is used to maintain the clocking circuit 128 in a normal power mode or a reduced power mode. As discussed above, for many applications it is advantageous to reduce power consumption by occasionally disabling the receiver's signal processing circuitry. After the signal processing circuitry is disabled for a period of time, the illustrated signal processing circuitry is reactivated in the full power mode for reacquisition of the received spread spectrum signal.

Another example embodiment of the present invention is directed to a receiver for use in a GPS. In a GPS, a GPS signal can be viewed as carrying an instantaneous reading of the position and clock of the satellites in view by a stationary user having its clock synchronized with the satellite clock. At the instant when the GPS signal is received, the user local time is recorded. By comparing the local time and the satellite time and the position information carried by the GPS signal, the measured delay caused by the finite speed of light and a range D to the satellite can be calculated. The receiver's location is somewhere on a sphere of radius D centered at the satellite. By performing the same type of measurement with three satellites simultaneously, the user position can be located in three dimensions at the intersection of three spheres. Most user clocks, however, are not precisely synchronized with satellites and, for this reason, a fourth ranging measurement is necessary to account for the local clock bias. The current GPS uses 24 satellites, each assigned a C/A code so that the signal from each satellite can be individually decoded. Most recent GPS receivers are equipped with 12 correlators to decode signals from 12 satellites concurrently. Four of the strongest signals are selected for ranging measurements.

Figure 2:
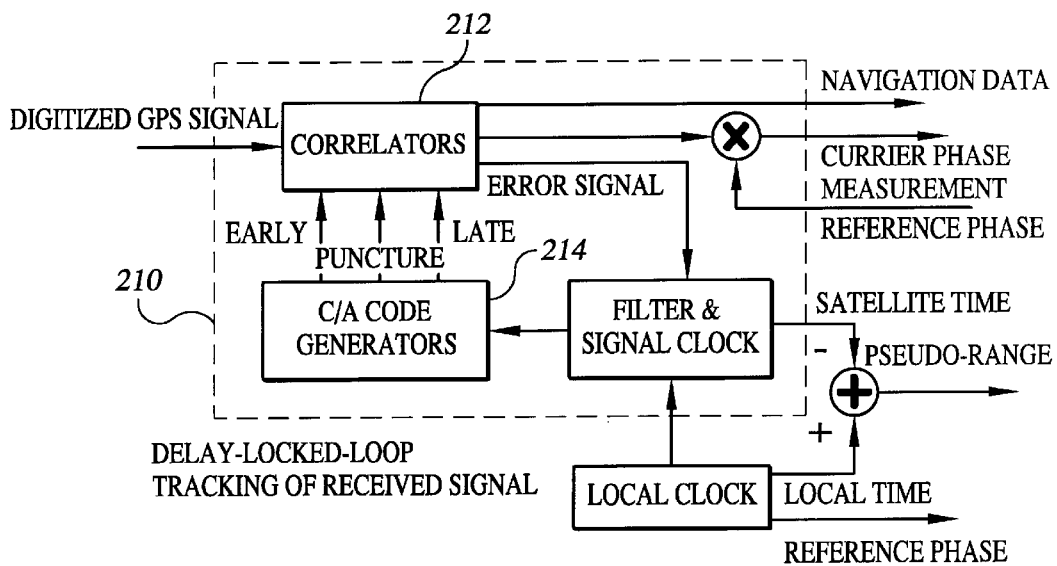
FIG. 2 is DLL, according to an example embodiment of the present invention, that may be used in connection with the system illustrated in FIG. 1.

FIG. 2 illustrates another example embodiment directed to a GPS receiver, according to the present invention and in which GPS ranging measurements are made using a DLL 210 such as the first example embodiment discussed above or another of the embodiments discussed below in connection with FIG. 3. In this example embodiment, satellite data is modulated with a PN code of 1023 chips that has a distinct beginning, called the epoch. The DLL 210 creates an internal replica of the known code sequence and adjusts the internal epoch until it exactly matches the received signal in delay. The clock time of the satellite at the time of the transmission is then subtracted from the user clock time to recover the measured pseudo-range.

Positioning accuracy reflects the final capability of most GPS receivers. Positioning accuracy is a function of the ranging accuracy and the geometry of the selected satellites, referred to as the dilution of precision (DOP). For the current nominal constellation, the worldwide median position DOP is approximately 2.5. To calculate the positioning accuracy, for example, the speed of light is 0.3 m/ns and it can be assumed that the satellite geometry produces a position DOP of 3. To achieve a position accuracy of 10 meters requires a ranging accuracy of 11 ns (10 m=(3*11 ns)*(0.3 m/ns)). This calculated period is about one percent of a chip interval.

In this example, the GPS baseband processing consists of two parts: a signal processing block for data acquisition and a navigation block for position calculation. The signal processing block receives the digitized baseband signal which is then correlated with a locally generated C/A spreading code. The path between the satellite and the receiver which the incoming signal travels through introduces a phase delay in the spreading code. The phase delay can be precisely measured by a DLL and converted to the pseudo-range which is then used by the navigation data processor, as may be conventionally implemented, to compute the user's position.

To achieve low power consumption, the GPS duty cycle can be reduced through fast synchronization. Since position and time update is only required occasionally, rapid acquisition and tracking speed allows the receiver to spend more time in the power-down mode, reducing total power consumption. Thus, it can be advantageous to occasionally cycle power (e.g., to a reduced power mode) and use one of the disclosed fast-tracking synchronization schemes to minimize the acquisition time.

Many existing GPS receivers correlate the received signal with a reference pseudo-noise code by employing a code generator that is clocked by a numerically controlled oscillator (NCO). The frequency of the NCO is adjusted so that the local reference code is generated at the same frequency as the incoming frequency, which has been altered by the Doppler frequency. In these architectures, rapid reacquisition is attained by operating several of these correlators at different time offsets in parallel. The complexity in the receiver grows rapidly with increasing degree of parallelism since separate adders are required for each correlator. As discussed below, various implementations of the present invention are directed to a synchronizer-correlator architecture involving a fast-tracking synchronizer, such as the one characterized in the first example embodiment, and optionally a low-power implementation of parallel correlators.

The blocks 212 and 214 (depicted with the terminology "Correlators" and "C/A Code Generators") of FIG. 2 are further detailed in FIG. 3, as discussed below. Once the received signal is properly interpolated and convolved with the local reference code, as implemented by a matched filter 312, the position of the largest correlation value represents a coarse estimate of the phase offset between the reference and received signals. The correlation peak (the Punctual) and its two adjacent correlation values (the Early and Late) are used by the processor arrangement at block 316 to estimate the phase error. The phase error is then filtered using a loop filter whose output is the input to a numerically-controlled oscillator (NCO) 320, which controls a digital interpolator 324 to prepare the incoming data for the matched filter 312. An accumulator 330 is used to collect the synchronized data from the GPS signal to produce the navigation data for this particular example application.

Figure 3:
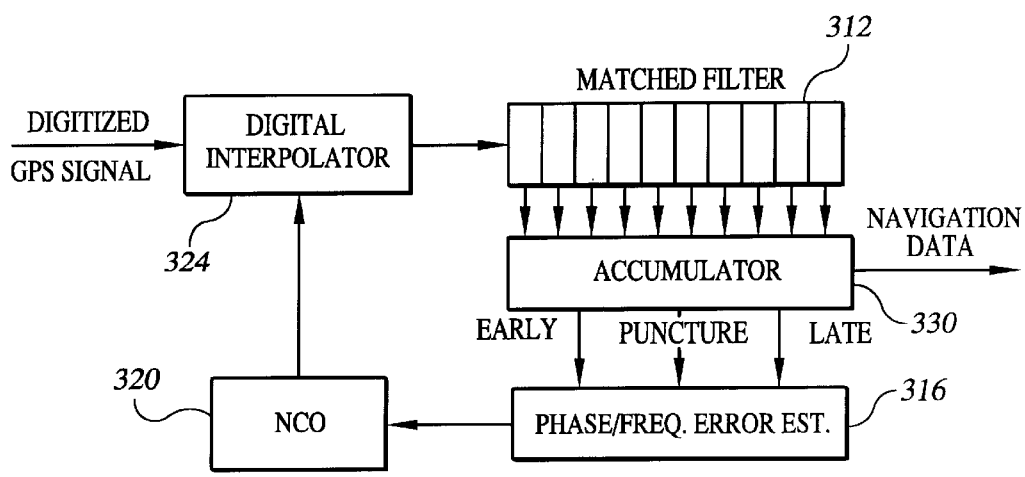
FIG. 3 is a block diagram expanding on two blocks illustrated in FIG. 2, according to another example embodiment of the present invention; and While the invention is amenable to various modifications and alternative forms, specifics thereof have been shown by way of example in the drawings and will be described in detail. It should be understood, however, that the intention is not to limit the invention to the particular embodiment described. On the contrary, the invention is to cover all modifications, equivalents, and alternatives falling within the spirit and scope of the invention as defined by the appended claims.

Another particular example implementation of the synchronizer correlator design of FIG. 3 involves searching over a window of seven code chips in parallel by obtaining squared correlation results of twenty-one phase offsets each separated by one-third of a chip. Correlation is performed over a duration of a single C/A code epoch (1023 chips per epoch). Accumulation of sixteen C/A code epochs is performed before a phase error is estimated and corrected for the next cycle (sixteen code epochs per phase error update).

The twenty-one phase-offset accumulation results are denoted as $Z_\epsilon^{(\tau)}$, where $\epsilon \in \{-10T_c/3, -9T_c/3, -8T_c/3, \ldots, 10T_c/3\}$, $T_c$ is the chip duration, and $\tau$ is the actual phase error. A maximum selector block selects the maximum $Z_\epsilon^{(\tau)}$, referred to as $Z_{\epsilon max}^{(\tau)}$, where $\epsilon_{max}$ is the maximum likelihood estimate of $\tau$ limited by the finite quantization error of using a $T_c/3$ sampling interval. The estimate of $\tau$, denoted as $\hat{\tau}$, is further refined by exploiting the dependency of $Z_{\epsilon max}^{(\tau)}$ to its adjacent neighbors—$Z_{\epsilon max}^{(\tau)}{+T_c/3}$ and $Z_{\epsilon max}^{(\tau)}{-T_c/3}$.

In another particular example implementation, the "three consecutive $Z_r^{(t)}$ values," where $x \in \{\epsilon_{max}+T_c/3, \epsilon_{max}-T_c/3\}$, are fit to a quadratic curve via conventional processor calculations and/or look-up methods. A quadratic curve is selected because the correlation energy values of bandlimited signals are smooth and appear almost quadratic. The phase offset corresponding to the peak of the quadratic curve, $\hat{\tau}$, is readily computed by differentiation. Mathematically, this phase offset is represented as:

$$\phi \text{ error} = \hat{\tau} = \varepsilon_{max} + \frac{1}{4} \cdot \frac{Z\varepsilon_{max}^{(\tau)}{+T_c/3} - Z\varepsilon_{max}^{(\tau)}{-T_c/3}}{2Z\varepsilon_{max}^{(\tau)} - Z\varepsilon_{max}^{(\tau)}{+T_c/3} - Z\varepsilon_{max}^{(\tau)}{-T_c/3}} T_c.$$

If $\epsilon=0$, the quadratic curve fit operation can be viewed as similar to a normalized early-late DLL discriminator. Treating the above equation as the characteristic equation of a discriminator with an extended linear range, the value of $\hat{\tau}$ drives loop filter. In many conventional DLL approaches, the phase error variance is proportional to the loop gain bandwidth, and the required tracking time is inversely proportional to it. Thus, any fixed choice of a loop gain bandwidth represents a trade-off between the required tracking time and the desired phase error variance. Advantageously, the fast synchronizer approaches discussed herein in accordance with the present invention can be implemented to employ a variable gain DLL to minimize acquisition time and phase error variance simultaneously.

The above baseband signal y(t) is sampled at $2/T_v$ such that, the kth sample is:

$r_k^{(i)} = y(kT_c + (iT_c/2) + \tau_m - \hat{\tau}_m) = y(kT_c + (iT_c/2) + \epsilon_m)$, where $i \in \{0,1\}$, $\hat{\tau}_m$ is the receiver's estimate of the sampling phase $\tau_m$, and $\epsilon_m = \tau_m - \hat{\tau}_m$. These samples are then employed to achieve fine acquisition, which consists of a discriminator and a loop filter that updates the sampling phase.

The above-characterized channel is therefore modeled as a memoryless channel with additive white Gaussian noise (AWGN). The input signal r(t) to the receiver is match filtered, where it is assumed that the convolution of the transmit and receive filter is a raised-cosine pulse.

According to a more specific embodiment of the present invention, the above discrimination approach uses the squared correlation results of five branches, where each branch correlates and squares at a 1/m chip offset, where m is an integer value. The results of correlation and squaring of the five branch at time segment index m are denoted as:

$Z_{2-,m}, Z_{1-,m}, Z_{0,m}, Z_{1+,m},$ and $Z_{2+,m},$ corresponding to "early-early," "early," "prompt," "late," and "late-late," branches, respectively. The classical discriminator output is the difference between the "early" and "late" branches. The "prompt" branch is also used to decode the received signal in the discriminator of this embodiment which uses a total of five branches. The five $Z_{x,m}$ values, where $x \in \{2-,1-,0,1+2+\}$, pass through a curve-fit block, which outputs the timing error estimate defined in terms of the above-characterized receiver's estimate of the offset in phase. The curve-fit block operates by first selecting the branch with the largest $Z_{x,m}$ value. This branch provides a rough timing error estimate. Using the squared correlation values of its two adjacent neighbors, this estimate is refined by fitting it to a quadratic curve using the $Z_{x,m}$ values of these three consecutive branches. A quadratic curve is selected because the squared correlation values of band-limited signals are smooth and appear almost quadratic. The timing offset corresponding to the peak of the quadratic curve, which is readily computed by differentiation, is the timing error. Solving for the timing error using the above approach, the curve-fit block is described as follows:

$$\eta(\varepsilon) = \begin{cases} \frac{3T_c}{2M}, & \text{if } Z_{2-} \text{ is max} \\ \frac{T_c}{M} + \frac{1}{2M} \cdot \frac{Z_{2-} - Z_0}{2Z_{1-} - (Z_0 - Z_{2-})} T_c, & \text{if } Z_{1-} \text{ is max} \\ \frac{1}{2M} \cdot \frac{Z_{1-} - Z_{1+}}{2Z_0 - (Z_{1-} - Z_{1+})} T_c, & \text{if } Z_0 \text{ is max} \\ -\frac{T_c}{M} + \frac{1}{2M} \cdot \frac{Z_0 - Z_{2+}}{2Z_{1+} - (Z_{2+} - Z_{1-})} T_c, & \text{if } Z_{1+} \text{ is max} \\ -\frac{3T_c}{2M}, & \text{if } Z_{2+} \text{ is max} \end{cases}$$

If either "late-late" or "early-early" branch is selected, which are edge cases with only one adjacent branch, the timing error estimate is set at $-3T_c/2M$ respectively.

The skilled artisan will appreciate that the various blocks shown in the above FIGS. can be implemented using any of a variety of structures, including but not limited to conventional circuit manufacturing tools (e.g., HDL) with the illustrated blocks representing functional tasks that can be separately implemented or combined into the same structure, and can be implemented as discrete components, integrated blocks and/or a combination thereof. Further, the various embodiments described above are provided by way of illustration only and should not be construed to limit the invention. The skilled artisan will readily recognize that various modifications and changes may be made to the exemplary embodiments and applications described herein. For example, while the embodiments discussed herein refer only to non-coherent discrimination due to the received spread signal-to-noise ratio (SNR) being generally too low to allow carrier synchronization prior to code synchronization, the proposed discriminator is readily modified to operate coherently. Such changes do not depart from the true spirit and scope of the present invention which is set forth in the following claims.

What is claimed is:

1. In a receiver arrangement having a reference clock for receiving a signal over a path that introduces a phase error thereto, the signal being modulated by a waveform having a bit rate defined in terms of a bit-pulse duration (chip), a method of synchronizing to the signal, comprising:

for at least one reference code, obtaining correlation results from at least several timing offsets of the signal, wherein each timing offset is separated by a portion of a chip;

selecting at least three consecutive correlation results; and providing the selected consecutive correlation results as inputs to a polynomial relationship having a degree of at least two, and determining therefrom a timing error useful in receiving the signal.

2. A method of synchronizing, according to claim 1, wherein the step of determining a timing error includes at least one of the following: estimating a phase error from the polynomial relationship; and determining an absolute timing error.

3. A method of synchronizing, according to claim 2, further including effectively adjusting the reference clock in response to the step of determining the timing error.

4. A method of synchronizing, according to claim 1, wherein the polynomial relationship is quadratic.

5. A method of synchronizing, according to claim 1, wherein the signal is a direct-sequence spread spectrum signal, and determining includes using an early-late DLL discrimination process.

6. A method of synchronizing, according to claim 5, wherein using an early-late DLL discrimination process includes normalizing relative to the portion of a chip.

7. A method of synchronizing, according to claim 6, wherein obtaining correlation results includes sampling the received signal, and, for the same reference code, adjusting the phase of the received signal and re-sampling the received signal.

8. A method of synchronizing, according to claim 1, wherein the portion of a chip is about one-third of a chip, and wherein selecting at least three consecutive correlation results includes selecting five consecutive correlation results.

9. A method of synchronizing, according to claim 8, wherein said at least several timing offsets is about twenty one.

10. A method of synchronizing, according to claim 1, further including using a multi-order variable gain phase-locking discrimination process.

11. A method of synchronizing, according to claim 10, wherein the multi-order variable gain phase-locking discrimination process is a second-order variable gain DLL discrimination process.

12. A method of synchronizing, according to claim 10, wherein the multi-order variable gain discrimination process includes decreasing both acquisition time and phase error variance simultaneously.

13. A method of synchronizing, according to claim 10, wherein the multi-order variable gain phase-locking discrimination process is a second-order variable gain DLL discrimination process, and the second-order variable gain DLL discrimination process includes minimizing both acquisition time and phase error variance simultaneously using the selected consecutive correlation results.

14. A method of synchronizing, according to claim 1, wherein the received signal includes modulated position-estimation data, and further including performing the steps recited in claim 1 for signals concurrently received from a plurality of signal generators.

15. A method of synchronizing, according to claim 14, wherein the signal is a direct-sequence spread spectrum signal.

16. A method of synchronizing, according to claim 14, further including storing a plurality of reference codes, wherein each reference code corresponds to a different one of the signal generators.

17. A method of synchronizing, according to claim 14, wherein the signal is a GPS signal.

18. A method of synchronizing, according to claim 1, further including operating in a reduced power-consumption mode in response to synchronizing to the signal.

19. A method of synchronizing, according to claim 18, further including operating in another higher power-consumption mode after operating in the reduced power consumption mode for a period of time.

20. A method of synchronizing, according to claim 19, wherein the period of time is a function of an expected clock drift time and a factor based on expected user-movement during a period corresponding to the reduced power-consumption mode.

21. A method of synchronizing, according to claim 1, wherein the steps recited in claim 1 are performed for received CDMA signals.

22. A method of synchronizing, according to claim 1, wherein adjusting the reference clock includes altering the frequency of a numerically-controlled oscillator.

23. A method of synchronizing, according to claim 1, wherein the method further includes periodically estimating a user position including decoding position-estimation data from the received signal.

24. A method of synchronizing, according to claim 1, wherein said at least three correlation results is five correlation results.

25. A receiver arrangement having a reference clock for receiving a signal over a path that introduces a phase error thereto, the signal being modulated by a waveform having a bit rate defined in terms of a bit-pulse duration (chip), the receiver arrangement, comprising:

for at least one reference code, means for obtaining correlation results from at least several timing offsets of the signal, wherein each timing offset is separated by a portion of a chip;

means for selecting at least three consecutive correlation results;

means for providing the selected consecutive correlation results as inputs to a polynomial relationship having a degree of at least two; and means for determining therefrom a timing error useful in receiving the signal.

26. A receiver arrangement, according to claim 25, wherein the polynomial relationship is quadratic, said at least three consecutive correlation results includes five consecutive correlation results, the portion of a chip is about one third of the chip, and said at least several timing offsets is at least twenty one.

27. A receiver arrangement, according to claim 26, further comprising: means for providing normalization relative to the portion of a chip; a front-end circuit for receiving the signal as a direct-sequence spread spectrum signal; means for using a second-order variable-gain phase-locking early-late DLL discrimination process that minimizes both acquisition time and phase error variance simultaneously using a plurality of the selected consecutive correlation results; a numerically-controlled oscillator; and means, responsive to the determined error, for altering the frequency of the numerically-controlled oscillator.

28. A receiver arrangement having a reference clock for receiving a signal over a path that introduces a phase error thereto, the signal being modulated by a waveform having a bit rate defined in terms of a bit-pulse duration (chip), the receiver arrangement, comprising:

for at least one reference code, a logic circuit constructed and arranged to obtain correlation results from at least several timing offsets of the signal, wherein each timing offset is separated by a portion of a chip, to select at least three consecutive correlation results, and to provide the selected consecutive correlation results as inputs to a polynomial relationship having a degree of at least two; and a signal processing arrangement configured to determine therefrom a timing error useful in receiving the signal.

29. A receiver arrangement, according to claim 28, wherein the signal processing arrangement and the logic circuit are integral.

30. A receiver arrangement, according to claim 28, wherein the signal processing arrangement and the logic circuit are separate and distinct circuits.

31. A receiver arrangement, according to claim 28, wherein the signal processing arrangement is further configured to provide at least one of the following: an estimate of a phase error from the polynomial relationship; and an absolute timing error.

32. A receiver arrangement, according to claim 31, further including means for effectively adjusting the reference clock in response to determining the error.

33. A receiver arrangement, according to claim 28, wherein the polynomial relationship is quadratic.

34. A receiver arrangement, according to claim 28, further including a front-end circuit for receiving the signal as a direct-sequence spread spectrum signal, and wherein the processor arrangement is further configured to use an early-late DLL discrimination process.

35. A receiver arrangement, according to claim 34, wherein the processor arrangement is further configured to provide normalization relative to the portion of a chip.

36. A receiver arrangement, according to claim 35, further including means for sampling the received signal, and, for the same reference code, adjusting the phase of the received signal and re-sampling the received signal.

37. A receiver arrangement, according to claim 28, wherein the portion of a chip is about one-third of a chip.

38. A receiver arrangement, according to claim 37, wherein said at least several timing offsets is about 21, and wherein said at least three correlation results is five correlation results.

39. A receiver arrangement, according to claim 28, further including means for signal processing using a multi-order variable gain phase-locking discrimination process.

40. A receiver arrangement, according to claim 39, wherein the multi-order variable gain phase-locking discrimination process is a second-order variable gain DLL discrimination process.

41. A receiver arrangement, according to claim 39, wherein the multi-order variable gain discrimination process includes decreasing both acquisition time and phase error variance simultaneously.

42. A receiver arrangement, according to claim 39, wherein the multi-order variable gain phase-locking discrimination process is a second-order variable gain DLL discrimination process, and the second-order variable gain DLL discrimination process includes minimizing both acquisition time and phase error variance simultaneously using the selected consecutive correlation results.

43. A receiver arrangement, according to claim 28, wherein the received signal includes modulated position-estimation data, and further including a plurality of signal generators for receiving data from the signal concurrently.

44. A receiver arrangement, according to claim 43, wherein the signal is a direct-sequence spread spectrum signal.

45. A receiver arrangement, according to claim 43, further including means for storing a plurality of reference codes, wherein each reference code corresponds to a different one of the signal generators.

46. A receiver arrangement, according to claim 28, further including means for controlling the receiver arrangement to selectively operate in low-power consumption mode, or in a higher power-consumption mode.

47. A receiver arrangement, according to claim 46, wherein the means for controlling the receiver arrangement is adapted to select the higher-power consumption mode after operating in the reduced power consumption mode for a period of time, and wherein the period of time is a function of an expected clock drift time and a factor based on expected user-movement during a period corresponding to the reduced power-consumption mode.

48. A receiver arrangement, according to claim 28, further including a numerically-controlled oscillator and means, responsive to the determined error, for altering the frequency of the numerically-controlled oscillator.

49. A receiver arrangement, according to claim 28, wherein the method further including means for periodically estimating a user position.

50. A communication system, comprising:
   a receiver arrangement having a reference clock for receiving a signal over a path that introduces a phase error thereto, the signal being modulated by a waveform having a bit rate defined in terms of a bit-pulse duration (chip);
   for at least one reference code and within the receiver arrangement, a logic circuit configured to obtain correlation results from at least several timing offsets of the signal, wherein each timing offset is separated by a portion of a chip, to select at least three consecutive correlation results, and to provide the selected consecutive correlation results as inputs to a polynomial relationship having a degree of at least two; and further configured to determine therefrom a timing error useful in receiving the signal.

* * * * *

UNITED STATES PATENT AND TRADEMARK OFFICE
CERTIFICATE OF CORRECTION

PATENT NO.    : 6,614,834 B1                                                Page 1 of 1
DATED         : September 2, 2003
INVENTOR(S)   : Meng et al.

It is certified that error appears in the above-identified patent and that said Letters Patent is hereby corrected as shown below:

Column 7,
Line 39, "$2/T_v$" should read -- $2/T_o$ --.

Signed and Sealed this

Sixteenth Day of December, 2003

JAMES E. ROGAN
*Director of the United States Patent and Trademark Office*